Figure 1:
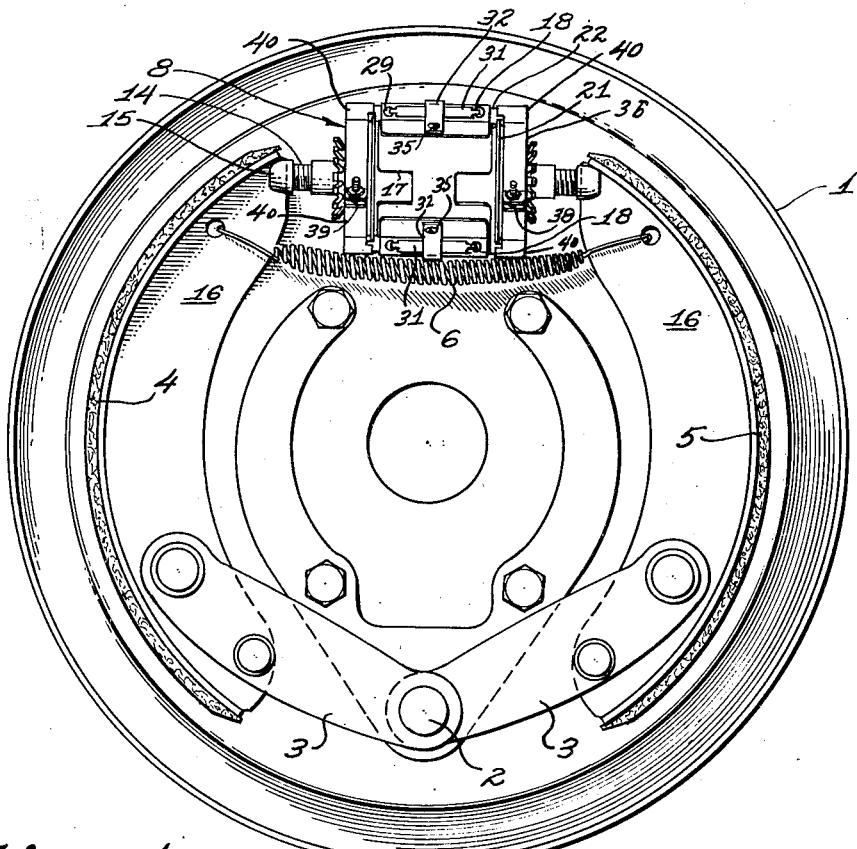

May 15, 1951     A. VAN DER WILT     2,553,343
BRAKE CLEARANCE MAINTAINING DEVICE

Filed June 1, 1948     3 Sheets-Sheet 1

INVENTOR.
ARNOLD VAN DER WILT
BY
Harold J. LeVesconte
ATTORNEY

May 15, 1951  A. VAN DER WILT  2,553,343
BRAKE CLEARANCE MAINTAINING DEVICE
Filed June 1, 1948  3 Sheets-Sheet 2
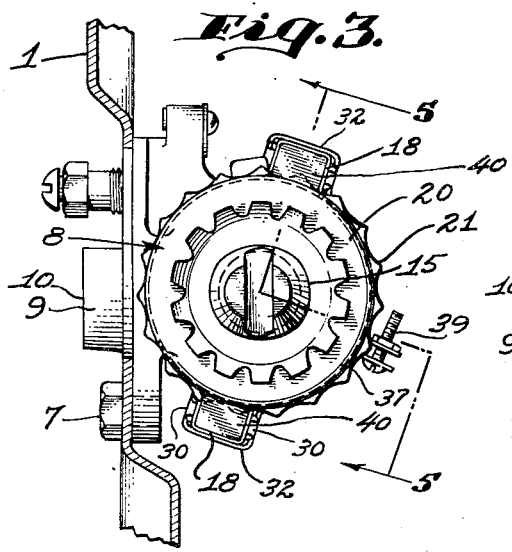
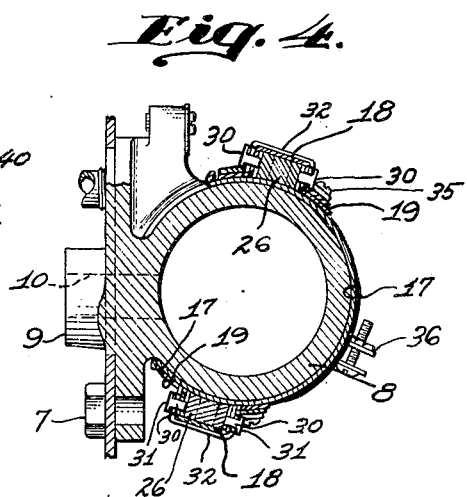
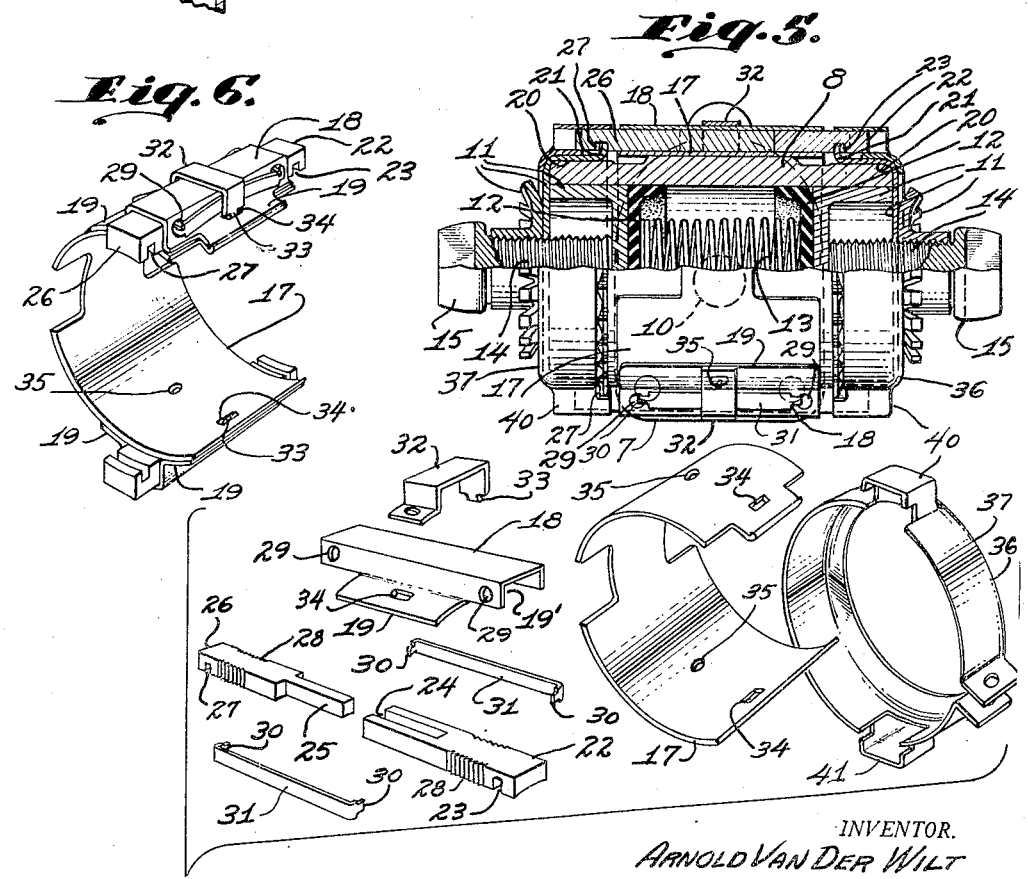
INVENTOR.
ARNOLD VAN DER WILT
BY
Harold J. LeVesconte
ATTORNEY May 15, 1951     A. VAN DER WILT     2,553,343
BRAKE CLEARANCE MAINTAINING DEVICE
Filed June 1, 1948     3 Sheets-Sheet 3
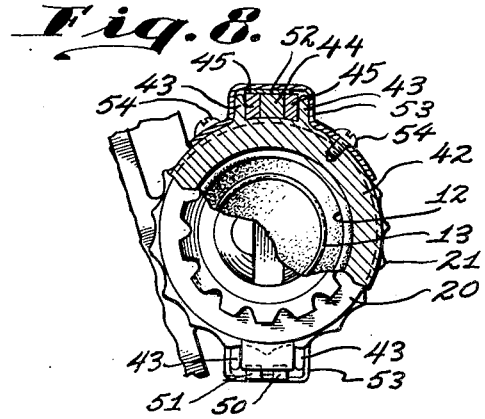
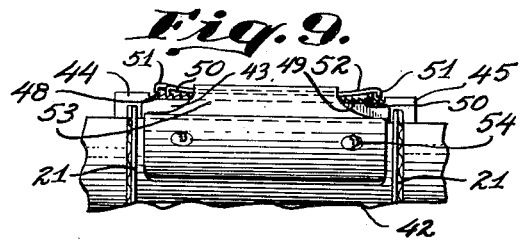
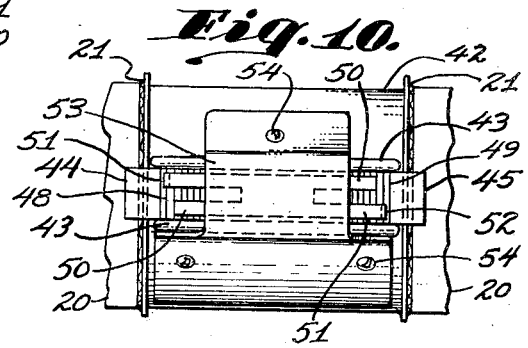
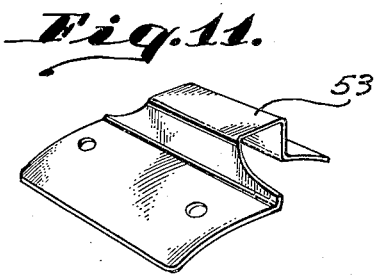
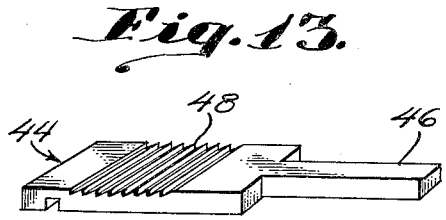
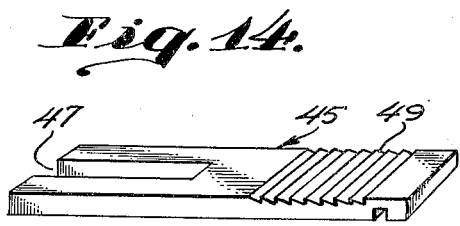
INVENTOR.
ARNOLD VAN DER WILT
BY
Harold J. LeVesconte
ATTORNEY.

Patented May 15, 1951

2,553,343

UNITED STATES PATENT OFFICE 2,553,343

BRAKE CLEARANCE MAINTAINING DEVICE

Arnold Van Der Wilt, Glendale, Calif., assignor of one-fourth to Harold J. Le Vesconte, Glendale, Calif.

Application June 1, 1948, Serial No. 30,408

12 Claims. (Cl. 188—79.5)

This invention relates to brakes for motor vehicles and more particularly to a means for maintaining a minimum clearance between the brake shoe and the brake drum regardless of the amount of wear so that the vehicle operator will have available at all times the full stroke of the brake pedal to effect the braking action.

Heretofore, it has been necessary to adjust the brakes of motor vehicles from time to time to take up the clearance occasioned by the wear of the brake shoes so that less of the brake pedal stroke will be used to take up this clearance and so that more of the stroke will be available for the braking action. Countless accidents have been traced to the fact that a vehicle involved had brakes that were ineffective to make an emergency stop because the brakes were not adjusted to allow maximum braking effort.

It is, therefore, the principal object of this invention to provide an automatic take up means for motor vehicle brakes which is constantly operative to maintain a minimum clearance between the brake shoes and the brake drum so that substantially the full brake pedal stroke is available for braking effort and a minimum of said stroke is required for taking up the clearance.

Another object of the invention is to provide an automatic brake adjusting means which is applicable to the braking means of existing vehicles without making any changes in the construction of the braking means to which it is applied.

Still another object of the invention is to provide a brake adjusting means which may be applied to each wheel of a vehicle and which will operate to maintain minimum clearance between the brake shoes and drum in each wheel automatically without regard for the rate of wear in the other wheels of the vehicle.

A still further object of the invention is to provide a brake adjusting means for motor vehicles having hydraulic brakes which is associated with the brake cylinders and which serves to limit the extent of retraction of the brake cylinder pistons.

A still further object of the invention is to provide an automatic brake adjusting means which achieves the above desirable objectives and which is simple in construction, economical to manufacture, which may be easily applied to existing vehicles, and which is reliable in operation.

Figure 2:
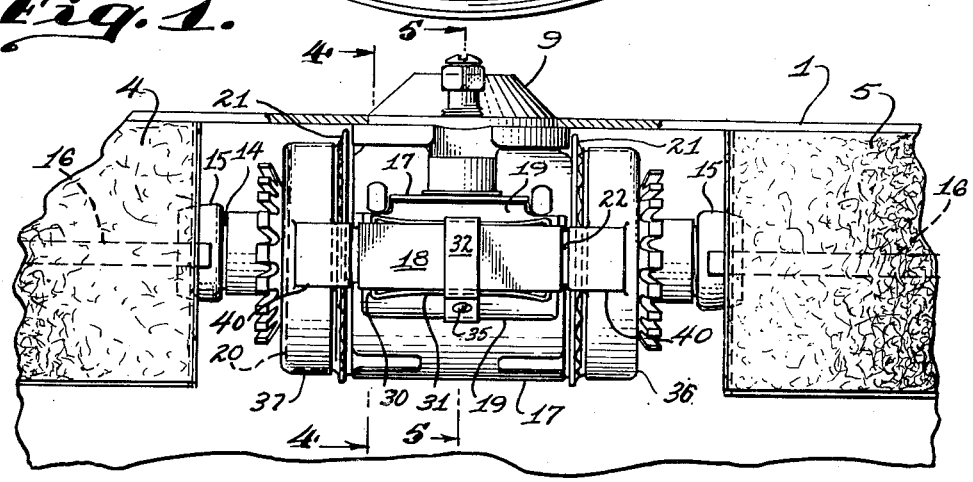

With the above objects in view, together with such other objects and advantages as may subsequently appear, the invention resides in the parts, and in the construction, combination, and arrangement of parts hereinafter described, by way of example, and illustrated in the accompanying drawings in which:

Fig. 1 is a side elevation of a typical motor vehicle brake assembly showing one form of the invention applied thereto, Fig. 2 is an enlarged, fragmentary, top plan view of Fig. 1, Fig. 3 is a left hand end elevation of Fig. 2, Fig. 4 is a sectional view taken on the lines 4—4 of Fig. 2, Fig. 5 is a side elevation, partly in section; the section being taken on the staggered line 6—6 of Fig. 3, Fig. 6 is a perspective view of the form of the invention shown in Figs. 1 to 5 inclusive, Fig. 7 is an exploded view of certain of the component parts of the form of the invention shown in Figs. 1 to 6, inclusive; some of the duplicate parts being omitted, Fig. 8 is an end elevation, partly in section, of a brake cylinder having the invention incorporated therein, Figs. 9 and 10 are a side elevation and a top plan view, respectively, of the brake cylinder shown in Fig. 8, Fig. 11 is a perspective view of one of the clips employed in the form of the invention shown in Figs. 8, 9, 10, Fig. 12 is a perspective view of one of the springs which operate to maintain minimum brake clearance in the form of the invention shown on Figs. 8, 9, 10, and Figs. 13 and 14 are perspective views of a pair of brake-adjusting ratchet blocks employed in the form of the invention shown in Figs. 8, 9, and 10.

Referring to Fig. 1, there is shown a typical brake assembly comprising a back plate 1 having pivotally mounted thereon by a bolt 2 and a pair of arms 3, 3, a pair of brake shoes 4 and 5 normally held retracted from engagement with the internal face of a brake drum (not shown) by a tension spring 6 connected to the free upper ends of the brake shoes. Secured to the back plate 1 by bolts 7, is a brake cylinder 8 having a portion 9 thereof extending through the plate 1 for connection to a fluid line and having a port 10 opening into the mid-portion of the cylinder. The cylinder is open at both ends and slidably mounted in each end thereof is a piston assembly 11 and a sealing element 12. The piston assemblies are normally urged away from each other by a compression spring 13 located in the cylinder and extending between the opposed faces of the piston assemblies. The outer ends of the piston assemblies 11, 11 are internally threaded to engage the shanks 14, 14 of a pair of bolts 15, 15 the heads of which are slotted to receive and engage the center ribs 16, 16 of the upper ends of the brake shoes 4 and 5. When fluid pressure is applied to the interior of the brake cylinder, the piston assemblies will be moved outwardly of the cylinder, causing the brake shoes to be expanded into contact with the brake drum. All of the above is typical of hydraulic brakes on motor vehicles and has been described for a better understanding of the invention and the application thereof to braking devices.

The form of the invention shown in Figs. 1 to 7, comprises a C-shaped spring metal base member 17 adapted to be sprung on to the body of a brake cylinder and to remain in place by reason of its resilient engagement therewith. A pair of guide elements 18, 18 of shallow U-shape and having laterally extending flange portions 19, 19 are welded or otherwise secured to the exterior of the base member 17 near the ends thereof to form a pair of guideways 19', 19' extending parallel to the axis of the cylinder and disposed at substantially diametrically opposite points with respect to said axis. Associated with each of these guideways is a means for maintaining a minimum operating clearance for the brakes and, since these means are identical, a description of one will serve to describe both.

Each of the piston assemblies includes an annular flange 20 which slidingly engages the exterior of the end of the cylinder and the flange terminates in an outturned serrated edge 21. Slidingly mounted in one end of the guideway is a block 22, one end of which extends beyond the guideway and is provided with a groove 23 into which the flange edge 21 extends. The groove is somewhat wider than the thickness of the flange edge as shown in Fig. 6 and the amount of play or loose engagement between the block and the flange edge is the factor that provides the minimum operating clearance between the brakes and the brake drum as will later be described in more detail. The other or inner end of the block 22 is housed within the guideway and is provided with a longitudinal slot 24 which is slidingly engaged by the tongue 25 on the inner end of a block 26, the outer end of which extends beyond the other end of the guideway 19' and is provided with a groove 27 which engages the edge 21 of the flange 20 on the other piston assembly in the same manner and with the same loose engagement as that between the groove 23 and the edge 21 of the opposite piston assembly.

Adjacent their outer ends, each of the blocks 22 and 26 are provided with sawtooth serrations 28 the straight faces of which face the inner ends of the blocks. On each block, the serrations on one side are positioned one half the distance between adjacent serrations closer to the outer end of the block than on the other side or, in other words, the serrations on opposite sides of the blocks are staggered with respect to each other. The side walls of the guide element 18 near each end thereof are provided with holes 29 through which the inturned ends 30, 30 of a pair of flat springs 31, 31 extend and engage the serrations on both sides of the blocks 22 and 26 as best shown in Fig. 4. The ends of the springs are slightly longer than the thickness of the sidewall of the guide element plus the depth of the serrations and the springs at their midpoint are held in close proximity to the sidewalls of the guide element by a clip 32 embracing the springs and the guide element and having an outturned end portion 33 engaging a slot 34 in one flange 19 of the guide element and the base member 17 and having its other end secured to the other flange 19 of the guide element and the base member by a screw 35. As shown in Fig. 2, the clip 32 bows the midportions of the springs 31, 31 inwardly toward the sidewalls of the guide element creating an initial loading so that the ends of the springs will remain in positive engagement with the serrations 28 on both sides of both blocks. As the braking pressure is applied to the cylinder, the piston assemblies are caused to move outwardly and to carry the blocks 22 and 26 with them by the engagement with the flange edges in the grooves 23 and 27. As the blocks are thus moved the serrations 28 will ratchet past the ends 30 of the springs and will be prevented from moving back into the guideway by the engagement of the ends of the springs with the straight faces of the serrations. Due to the fact that the serrations are arranged a half serration apart on opposite sides of each block, the blocks will ratchet past the ends of the springs in increments of half the distance between adjacent serrations so that for given increments of outward movement heavier springs and deeper serrations can be employed.

This outward movement of the blocks will continue as far as the pistons are permitted to move in braking action, and when the braking pressure is relieved, the spring 6 will draw the brake shoes back from the brake drum and push the pistons back into the cylinder with consequent return of fluid to the master cylinder of the braking system. In the present invention, this return movement of the pistons is allowed to take place only to the extent of the clearance between the flange edges 21 and the grooves since the blocks are held against any return movement by the springs 31, 31. This clearance is sufficient to permit the brake shoes to be retracted the minimum amount to provide a safe operating clearance and thus a minimum amount of pedal movement will be required to take up this clearance in a braking operation. As the brake shoes wear, the blocks will be moved out step by step so that at all times the desired minimum operating clearance is maintained. It is also to be noted that the springs 31, 31 are free to move endwise slightly under the clip 32; the extent of such movement being limited by the slight amount of play between the spring ends 30 and the holes 29 in the sidewalls of the guide elements 18. By reason of this capacity of movement the springs and the blocks may shift endwise slightly as a unit to permit the brakes to center themselves for uniform distribution of braking pressure.

To apply the invention to existing vehicles it is only necessary to snap the assembled unit as shown in Fig. 6 over each brake cylinder with the blocks properly engaging the flange edges of each piston and to apply the clamp collars 36 and 37 to the annular flanges 20, 20 by means of the clamp screws 38 and 39 with the hood portions 40 and 41 of each collar extending over the ends of the blocks 22 and 26. These collars serve to prevent the blocks from slipping off the flange edges 21, 21 and to prevent the piston assemblies from unintended rotation with incident change of adjustment in the threaded engagement with the bolts 14, 14. In Fig. 7, only one of these collars is shown, but it will be understood that the collar 37 is merely a left hand form of the collar 36. Preferably at least two sets of clearance maintaining means should be mounted on the base member at diametrically opposite points on the piston assemblies, but it will be appreciated that for very small cylinders a single set may be all that is needed and that in other installations three or more sets may be desirable.

Referring now to Figs. 8 to 14, inclusive, a second form of the invention is shown in which the clearance maintaining means is incorporated in the brake cylinder instead of being an attachment therefor. In this form of the invention the exterior of the cylinder body 42 is provided with a pair of diametrically opposite grooves 43, 43 extending parallel to the axis of the cylinder. Slidingly mounted in each of these grooves is a pair of piston engaging blocks 44 and 45, the inner ends 46 and 47 of which also slidingly interengage each other and the outer ends of which are provided with flange engaging grooves corresponding to the grooves 23 and 27 in the blocks 22 and 26. Each of the blocks 44 and 45 on the side thereof opposite the flange engaging groove is provided with a series of transverse sawtooth serrations 48 and 49 which, incident to the outward movement of the blocks by the pistons, are engaged by the bifurcated ends 50 and 51 at each end of a flat spring 52 held against the blocks by a clip 53 which extends on both sides of the groove 43 and is secured to the cylinder body by a series of screws 53. This clip not only holds the spring 52 in engagement with the blocks, but it also holds the blocks 44 and 45 in place in the groove. As shown in Fig. 10 the end of 50 of the spring is slightly shorter than the end 51 so that as the blocks are moved outwardly by the pistons in braking operations, they will be moved alternately past these bifurcated ends in lesser increments than the spacing of adjacent serrations. As in the case of the first described form of the invention, the number of sets of clearance maintaining means to be employed with each cylinder is a matter of choice, but for general use two diametrically opposite sets will be found sufficient. Also in this form of the invention, the use of rotation preventing means such as the collars 36 and 37 is preferred, but since their use has been fully described previously they have been omitted from Figs. 8 to 14 to make the showing of that form of the invention clearer.

The mode of operation is the same as that of the first described form of the invention. In a braking operation, the pistons move the blocks outwardly past the ends of the spring with the bifurcated ends alternately engaging the straight faces of the serrations to prevent retracting movement of the blocks. On the completion of a braking operation the spring 6 will move the pistons into the cylinder as far as the loose engagement with the piston flange with the grooves in the blocks will permit and this clearance is sufficient to provide the minimum operating clearance for the brake shoes. Also, in this form of the invention, the springs and the blocks associated with each spring are free to move endwise slightly as a unit to enable the brakes to center themselves for uniform application of braking pressure. Further, as is the case with the first form of the invention, as the brakes wear, the blocks 44 and 45 will move out step by step to maintain the desired minimum operating clearance for the brake shoes.

Thus it is that by use of the present invention the brakes of a motor vehicle are rendered self-adjusting and the brakes of each wheel are independently adjusted according to the wear that takes place regardless of the extent of wear on any other wheel. The device is simple in construction and may be readily installed and is so constructed that it will take up wear in very small increments so that a maximum amount of pedal movement is available at all times for braking effort.

While I have described two particular forms of execution I do not limit myself to the exact forms of my invention described and shown, and the invention includes all such modifications in the parts and their equivalents and the combination and arrangement thereof as may come within the purview of the appended claims.

I claim:

1. In combination, a motor vehicle brake comprising a brake drum and brake shoes, a brake operator including a cylinder body and a pair of opposed brake shoe operating pistons and means associated therewith effective to limit retraction of said pistons with resultant maintenance of a minimum operating clearance for said brake shoes; said means comprising a pair of blocks slidably mounted in a guideway formed in the exterior of said cylinder body; each of said blocks having a loose connection with one of said pistons and having sawtooth serrations on one face thereof and spring means engaging said serrations and cooperating therewith to permit said blocks to be moved by said pistons incident to brake applying movements thereof and to limit the retraction of said pistons on cessation of the brake applying movement to an amount that will provide a minimum operating clearance between the brake shoes and the brake drums of the vehicle.

2. In combination, a motor vehicle brake comprising a brake drum and brake shoes, a brake operator including a cylinder body and a pair of opposed brake shoe operating pistons and means associated therewith effective to limit retraction of said pistons with resultant maintenance of a minimum operating clearance for said brake shoes; said means comprising a pair of blocks slidably mounted in a guideway formed in the exterior of said cylinder body; each of said blocks having a loose connection with one of said pistons and having sawtooth serrations on one face thereof and spring means engaging said serrations and cooperating therewith to permit said blocks to be moved by said pistons incident to brake applying movements thereof and to limit the retraction of said pistons on cessation of the brake applying movement to an amount that will provide a minimum operating clearance between the brake shoes and the brake drums of the vehicle; and a clip secured to said cylinder body and extending over said guideway effective to hold said blocks in said guideway and to hold said spring in engagement with said serrations.

3. In combination, a motor vehicle brake comprising a brake drum and brake shoes, a brake operator including a cylinder body and a pair of opposed brake shoe operating pistons and means associated therewith effective to limit retraction of said pistons with resultant maintenance of a minimum operating clearance for said brake shoes; said means comprising a pair of blocks slidably mounted in a guideway formed in the exterior of said cylinder body; each of said blocks having a loose connection with one of said pistons and having sawtooth serrations on one face thereof and spring means engaging said serrations and cooperating therewith to permit said blocks to be moved by said pistons incident to brake applying movements thereof and to limit the retraction of said pistons on cessation of the brake applying movement to an amount that will provide a minimum operating clearance between the brake shoes and the brake drums of the vehicle; said spring means at the point of engagement with each of said blocks being so constructed and arranged that said blocks will be prevented from retractive movements in increments of less extent than the distance between successive serrations.

4. In combination, a motor vehicle brake comprising a brake drum and brake shoes, a brake operator including a cylinder body and a pair of opposed brake shoe operating pistons and a plurality of devices associated therewith effective to limit retraction of said pistons at the cessation of a braking operation with resultant maintenance of a minimum operating clearance; said devices being circumferentially spaced about said cylinder and each of said devices comprising a pair of blocks slidably mounted in a guideway formed in the exterior of said cylinder body; each of said blocks having a loose connection with one of said pistons and having sawtooth serrations on one face thereof and spring means engaging said serrations and cooperating therewith to permit said blocks to be moved by said pistons incident to brake applying movements thereof and to limit the retraction of said pistons on cessation of the brake applying movement to an amount that will provide a minimum operating clearance between the brake shoes and the brake drums of the vehicle.

5. In combination, a motor vehicle brake comprising a brake drum and brake shoes, a brake operator including a cylinder body and a pair of opposed brake shoe operating pistons and a plurality of devices associated therewith effective to limit retraction of said pistons at the cessation of a braking operation with resultant maintenance of a minimum operating clearance; said devices being circumferentially spaced about said cylinder and each of said devices comprising a pair of blocks slidably mounted in a guideway formed in the exterior of said cylinder body; each of said blocks having a loose connection with one of said pistons and having sawtooth serrations on one face thereof and spring means engaging said serrations and cooperating therewith to permit said blocks to be moved by said pistons incident to brake applying movements thereof and to limit the retraction of said pistons on cessation of the brake applying movement to an amount that will provide a minimum operating clearance between the brake shoes and the brake drums of the vehicle; and a clip secured to said cylinder body and extending over said guideway effective to hold said blocks in said guideway and to hold said spring in engagement with said serrations.

6. A brake clearance maintaining device for the wheel of a motor vehicle having in combination a wheel, a wheel brake cylinder body and a pair of opposed brake cylinder pistons; said device being mounted entirely on said cylinder body and comprising a pair of blocks positioned exteriorly on said cylinder body and slidable axially thereof; each of said blocks having a loose connection with one of the pistons, and spring biased ratchet means effective to permit said blocks to be moved by the pistons incident to brake applying movements thereof and to limit the extent of retraction of the pistons on cessation of a brake applying movement to an amount that will provide a minimum operating clearance between the brakes and the brake drum associated with the vehicle wheel.

7. A brake clearance maintaining device for a motor vehicle having in combination a cylinder body and a pair of opposed brake operating pistons; said device being mounted entirely on said cylinder body and comprising a base member formed of a strip of sheet metal bent into a C-shape, a guideway on the exterior of said base member extending parallel to the axis about which the C-shape thereof is generated, a pair of blocks slidably mounted in said guideway and having their distal ends extending beyond the edges of said base member and adapted for loose connection with the pistons, and spring biased ratchet means effective to permit said blocks to be moved by the pistons incident to brake applying movements thereof and to limit the extent of retraction of the pistons on cessation of a brake applying movement to an amount that will provide a minimum operating clearance between the brake shoes and the brake drums of the vehicle.

8. A brake clearance maintaining device for a motor vehicle having in combination a cylinder body and a pair of opposed brake operating pistons; said device being mounted entirely on said cylinder body and comprising a pair of blocks positioned exteriorly on said cylinder body and slidable axially thereof; each of said blocks having a loose connection with one of the pistons and having sawtooth serrations on one side thereof, and spring means engaging said serrations and cooperating therewith to permit said blocks to be moved by the pistons incident to brake applying movements thereof and to limit the extent of retraction of the pistons on cessation of a brake applying movement to an amount that will provide a minimum operating clearance between the brake shoes and the brake drums of the vehicle.

9. A brake clearance maintaining device for a motor vehicle having in combination a cylinder body and a pair of opposed brake operating pistons; said device being mounted entirely on said cylinder body and comprising a pair of blocks positioned exteriorly on said cylinder body and slidable axially thereof; each of said blocks having a loose connection with one of the pistons and having sawtooth serrations on one side thereof, and spring means engaging said serrations and cooperating therewith to permit said blocks to be moved by the pistons incident to brake applying movements thereof and to limit the extent of retraction of the pistons on cessation of a brake applying movement to an amount that will provide a minimum operating clearance between the brake shoes and the brake drums of the vehicle; said spring means additionally having capacity for movement with said blocks as a unit incident to braking effort equalization movements of the pistons.

10. A brake clearance maintaining device for a motor vehicle having in combination a cylinder body and a pair of opposed brake operating pistons; said device being mounted entirely on said cylinder body and comprising a base member formed of a strip of sheet metal bent into a C-shape, a pair of guideways on the exterior of said base member extending parallel to the axis about which the C-shape thereof is generated and at substantially diametrically opposite points thereon with respect to said axis, a pair of blocks mounted in each of said guideways having their distal ends extending beyond the edge of said base member and adapted for loose connection with the pistons, and separate, spring biased ratchet means associated with each of said pairs of blocks effective to permit said blocks to be moved by the pistons incident to brake applying movements thereof and to limit the extent of retraction of the pistons on cessation of a brake applying movement to an amount that will provide a minimum operating clearance between the brake shoes and the brake drums of the vehicle.

11. A brake clearance maintaining device for a motor vehicle having in combination a cylinder body and a pair of opposed brake operating pistons; said device being mounted entirely on said cylinder body and comprising a pair of blocks positioned exteriorly on said cylinder body and slidable axially thereof; each of said blocks having a loose connection with one of the pistons and having sawtooth serrations on opposite sides thereof, and separate spring means engaging said serrations on said opposite sides of the blocks and cooperating therewith to permit said blocks to be moved by the pistons incident to brake applying movements thereof and to limit the extent of piston retraction on cessation of a brake applying movement to an amount that will provide a minimum operating clearance between the brake shoes and the brake drums of the vehicle; the serrations on one side of said blocks being staggered with respect to the serrations on the opposite side with resultant capacity of said blocks to move in increments of half the distance between successive serrations.

12. A brake clearance maintaining device for a motor vehicle having in combination a cylinder body and a pair of opposed brake operating pistons; said device being mounted entirely on said cylinder body and comprising a pair of blocks positioned exteriorly on said cylinder body and slidable axially thereof; each of said blocks having a loose connection with one of the pistons and both of said blocks having parallel, aligned side faces provided with sawtooth serrations, a spring having one end thereof engaging the serrations on one side of one of said blocks and having its other end engaging the serrations on the aligned face of the other of said blocks, and a second spring correspondingly engaging the serrations on the aligned opposite sides of both of said blocks; said springs cooperating with said blocks to permit said blocks to be moved by the pistons incident to brake applying movements thereof and to limit the extent of retraction of the pistons on cessation of a brake applying movement to an amount that will provide a minimum operating clearance between the brake shoes and the brake drums of the vehicle.

ARNOLD VAN DER WILT.

REFERENCES CITED

The following references are of record in the file of this patent:

UNITED STATES PATENTS

| Number | Name | Date |
|---|---|---|
| 2,175,446 | Rasmussen et al. | Oct. 10, 1939 |
| 2,386,913 | Sawtelle | Oct. 16, 1945 |

FOREIGN PATENTS

| Number | Country | Date |
|---|---|---|
| 384,829 | Germany | Nov. 6, 1923 |
| 546,789 | Great Britain | July 30, 1942 |
| 730,210 | France | Aug. 9, 1932 |